United States Patent
Karmakar et al.

(10) Patent No.: US 9,904,824 B2
(45) Date of Patent: Feb. 27, 2018

(54) MILLIMETRE-WAVE IMAGE-BASED CHIPLESS RFID SYSTEM

(71) Applicant: Monash University, Clayton (AU)

(72) Inventors: Nemai Chandra Karmakar, Wheelers Hill (AU); Mohammad Zomorrodi, Ferntree Gully (AU)

(73) Assignee: Monash University, Clayton, Victoria (AU)

( * ) Notice: Subject to any disclaimer, the term of this patent is extended or adjusted under 35 U.S.C. 154(b) by 0 days.

(21) Appl. No.: 15/331,140

(22) Filed: Oct. 21, 2016

(65) Prior Publication Data

US 2017/0116444 A1 Apr. 27, 2017

(30) Foreign Application Priority Data

Oct. 23, 2015 (AU) ................................ 2015246162

(51) Int. Cl.
| | |
|---|---|
| *G06K 7/10* | (2006.01) |
| *G01S 3/00* | (2006.01) |
| *G06K 19/067* | (2006.01) |
| *H01Q 1/00* | (2006.01) |
| *H04B 7/00* | (2006.01) |

(52) U.S. Cl.
CPC ............ *G06K 7/10356* (2013.01); *G01S 3/00* (2013.01); *G06K 19/0672* (2013.01); *H01Q 1/00* (2013.01); *H04B 7/00* (2013.01); *G06K 7/10316* (2013.01); *G06K 7/10366* (2013.01)

(58) Field of Classification Search
None
See application file for complete search history.

(56) References Cited

U.S. PATENT DOCUMENTS

| | | | |
|---|---|---|---|
| 2007/0200705 A1* | 8/2007 | Yamagajo | G06K 19/0726 340/572.7 |
| 2009/0231104 A1* | 9/2009 | Kofman | G06K 7/10009 340/10.1 |
| 2010/0109848 A1* | 5/2010 | Blair | A61G 13/10 340/10.2 |
| 2015/0015275 A1* | 1/2015 | Huang | G01M 5/0083 324/633 |
| 2017/0139042 A1* | 5/2017 | Alenljung | G01S 13/4454 |

OTHER PUBLICATIONS

Wang, "Virtual Antenna Array Analysis for MIMO Synthetic Aperture Radar", International Journal of Antennas and Propagation, 2012, 10 pages.

* cited by examiner

*Primary Examiner* — Leon-Viet Nguyen
(74) *Attorney, Agent, or Firm* — Baker & Hostetler LLP (57) ABSTRACT

A mm-wave RFID tag interrogation apparatus includes multiple transmitting antennas, and multiple receiving antennas. The transmitting and receiving antennas are spatially distributed and oriented in orthogonal polarization states. A transmitter is coupled to the transmitting antennas, and transmits a corresponding multiple number of separable mm-wave signals. A receiver coupled to the receiving antennas is configured to extract separable components of received mm-wave signals. A processing unit processes the extracted signal components using a synthetic aperture algorithm. An RFID tag, readable by the interrogation apparatus, includes meander-line conductive elements arranged to encode information spatially on a substrate.

11 Claims, 6 Drawing Sheets

MILLIMETRE-WAVE IMAGE-BASED CHIPLESS RFID SYSTEM

CROSS REFERENCE TO RELATED APPLICATION

This application claims the benefit of Australian Application No. 2015246162 filed Oct. 23, 2015, the disclosure of which is incorporated herein by reference in its entirety.

TECHNICAL FIELD

The present invention relates to radio frequency identification (RFID) technology, and more particularly to systems, tags and readers for chipless RFID using mm-wave imaging.

BACKGROUND

There exist many applications in which it is advantageous to mark articles with identifying information that can be detected and/or read by electronic means. These applications include logistics (e.g. tracking of articles in storage and/or transport), sales (e.g. automated identification and billing/charging for items), and security (e.g. identification and/or authentication of documents or articles, including identity cards and negotiable instruments such as banknotes).

Barcodes are presently among the most widespread identification systems. The most common type of barcode includes a sequence of printed vertical bars and spaces to represent numbers and symbols. More recently, two-dimensional printed codes, such as QR codes, have become more widely employed, due to their ability to store greater quantities of information. Identification of such printed codes is a line-of-sight process using optical techniques, such as scanning the code with a laser reader apparatus or capturing and processing an image using a digital camera.

Due to their very low cost, and ease of fabrication (i.e. they may be printed using a wide range of conventional printing technologies) one- and two-dimensional printed codes are utilised in a very wide range of applications, including identification of products for retail sale, identification and checkout of library books, tracking of manufacturing and shipping movement, access and authentication (e.g. car park entry and exit), and so forth. However, optical technologies have a number of disadvantages for many applications of practical interest. For example, the requirement for a 'line of sight' between a printed code and the corresponding reader requires that a human operator generally be present to direct the reading process. Furthermore, it is generally not possible to detect the presence or content of printed codes unless a line of sight is available.

One technology which overcomes the abovementioned limitations of printed code systems is radio frequency identification (RFID). A conventional RFID 'tag', which is suitable to be fixed to articles requiring identification, includes a small antenna, and, optionally, a microchip. Such a tag can be 'interrogated' by a reader, which includes a transmitter and antenna for generating a radio frequency (RF) signal. The RFID tag is a transponder which receives the signal transmitted by the reader, and responds with a corresponding, detectable, RF signal of its own. This signal is received by the reader using either the same antenna employed for transmission, or a separate receiving antenna. The response generated by the RFID tag may include information, such as digital data, and may uniquely identify the tag, and therefore the article to which it has been affixed.

RFID tags including a microchip have the advantage that significant quantities of information can be stored, and transmitted back to the reader as a time domain signal. However, the cost of providing a silicon chip in every tag has limited the mass deployment of such RFID systems. A potential solution to this drawback is to omit the chip, to provide a chipless tag, and employ a fully printable conductive structure (e.g. using metallic inks), which can be interrogated using an RF signal to generate a 'passive' response.

Time domain chipless RFID tags are, however, limited in their ability to encode sufficient information within a small tag size. As a result, frequency domain chipless tags have been developed in which the tag comprises one or more resonant circuits that yield a unique frequency signature. While such systems have been demonstrated, with satisfactory results, under laboratory conditions, commercial deployment has proven to be more challenging. This may be, at least in part, due to the very limited data-encoding capacity of frequency domain chipless tags based upon printing using conductive ink on a paper substrate. The combination of a low Q factor of the tag's resonators, as well as a requirement for relatively accurate and reproducible printing, result in tags with a data-encoding capacity that is below industry requirements.

The use of electromagnetic (EM) imaging using mm-wave radiation has recently been proposed by the present inventors, as an alternative chipless RFID technology. The EM imaging technique differs from current time- and frequency-domain approaches in that no resonant frequencies are detected by the reader, such that the system shows greater immunity to low Q factors, and errors or inaccuracy in printing. The previously proposed technique for EM imaging employs strip-line polarisers on a substrate which backscatter or reflect mm-wave radiation in a substantially orthogonal polarisation state to the incident radiation. The polarisation dependence of the resulting received signal provides good immunity against 'tag bending' effect, and the presence of highly reflective items within the reading environment.

The abovementioned advantageous attributes of EM imaging techniques suggest significant potential for industrial application through a low-cost printable tag structure. However, the previously proposed technique has at least one notable limitation. Specifically, in order to obtain sufficiently high-resolution imaging for decoding of information using mm-wave radiation, the reader must be moved relative to the tag during interrogation, in order to create a sufficiently large aperture for synthetic aperture radar (SAR) signal processing. This requirement limits the range of applications in which mm-wave EM imaging RFID systems may be deployed in practice, and increases the required reading time, which may be problematic in high-volume scanning applications.

Furthermore, it is clearly desirable in any EM imaging RFID system to minimise the required tag size for a given volume of stored information and/or backscattered signal strength.

The present invention therefore seeks to address at least these issues relating to reader movement and tag size.

It should be noted that the foregoing information is provided to provide a context for the present invention, and to assist in understanding its features and benefits. However, this should not be taken as an admission that any of this background information forms a part of the prior art or the common knowledge of persons having ordinary skill in the field of RFID technology.

SUMMARY

In one aspect the present invention provides a mm-wave RFID tag interrogation apparatus comprising:

a plurality (P) of transmitting antennas having a first spatial distribution and each arranged to transmit mm-wave radiation having a first state of polarisation;

a plurality (Q) of receiving antennas having a second spatial distribution and each arranged to receive mm-wave radiation having a second state of polarisation which is substantially orthogonal to the first state of polarisation;

at least one transmitter coupled to the transmitting antennas and configured to transmit a corresponding plurality of separable mm-wave signals;

at least one receiver coupled to the receiving antennas and configured to extract separable signal components of corresponding mm-wave signals received via each one of the receiving antennas; and a processing unit arranged to receive and process the extracted signal components using a synthetic aperture algorithm so as to locate one or more spatially distributed remote cross-polarising reflecting elements.

Advantageously, embodiments of the invention employ multiple transmit and receive antennas, in combination with multiple-input multiple-output (MIMO) techniques and synthetic aperture radar (SAR) imaging in order to provide enhanced spatial resolution without a requirement for physical movement of the reader/interrogator relative to an RFID tag comprising information encoded in the spatial distribution of cross-polarising reflective elements disposed on a suitable substrate.

A proof of concept demonstration, embodying the invention and employing a tag structure comprising meander-line conductive elements, has achieved EM image resolution of 17-bit data from a tag structure occupying only 20 percent of the area of a credit card. Embodiments of the invention are further able to provide superior immunity to multi-path interference, the presence of reflective surfaces, bending effects, non-optical line-of-sight, and inaccuracies in the printing or other fabrication techniques.

The number of the plurality P of transmitting antennas may be the same as, or different from the number of the plurality Q of receiving antennas. According to embodiments of the invention, the transmitter is configured to transmit the plurality of separable signals which comprises a set of pulses wherein each pulse is transmitted successively in time via a corresponding one of the transmitting antennas. In embodiments of the invention the receiver is configured to extract received signal components by gating output from each one of the receiving antennas during a period corresponding to reception of one of the set of transmitted pulses.

In embodiments of the invention, the synthetic aperture algorithm generates a virtual antenna array having a larger number of antenna elements and a larger aperture size than the real antenna array comprising the transmitting and receiving antennas. The synthetic aperture algorithm is preferably an optimised MIMO algorithm. The optimised MIMO algorithm may be optimised through a genetic algorithm.

In some embodiments, the transmitting antennas and receiving antennas are arranged in corresponding parallel linear arrays. As noted above, in some embodiments, the one or more spatially distributed remote cross-polarising reflective elements each comprises a conductive meander-line element. According to certain embodiments the conductive meander-line elements are arranged in a two-dimensional array comprising a first plurality (n) of columns and a second plurality (m) of rows, wherein each column encodes an information bit.

In another aspect, the invention provides a method of mm-wave RFID tag interrogation which comprises:

transmitting, via a plurality (P) of transmitting antennas having a first spatial distribution, a corresponding plurality of separable mm-wave signals;

receiving, via a plurality (Q) of receiving antennas having a second spatial distribution, a corresponding plurality of received mm-wave signals;

processing the received millimeter wave signals to extract separable signal components of each received mm-wave signal; and further processing the extracted signal components using a synthetic aperture algorithm so as to locate one or more spatially distributed remote cross-polarising reflective elements.

In a further aspect, the invention provides a mm-wave RFID tag which comprises an arrangement of conductive elements configured to encode information spatially on a substrate, wherein each conductive element is adapted to scatter incident-polarised mm-wave radiation to produce a substantially orthogonally polarised reflected mm-wave radiation, and wherein each conductive element comprises a meander-line.

In some embodiments, the arrangement comprises a two-dimensional array comprising a first plurality (n) of columns and a second plurality (m) of rows, wherein each column encodes an information bit.

According to some embodiments, a first binary value is encoded by the presence of the conductive elements in a corresponding column, and a second binary value is encoded by the absence of the conductive elements in a corresponding column.

Further features and benefits of the invention will be apparent from the following description of embodiments, which is provided by way of example only and should not be taken to limit the scope of the invention as it is defined in any of the preceding statements, or in the claims appended hereto.

BRIEF DESCRIPTION OF THE DRAWINGS

Embodiments of the invention will now be described with reference to the accompanying drawings, in which like reference numerals indicate like features, and wherein.

DETAILED DESCRIPTION OF ILLUSTRATIVE EMBODIMENTS

Figure 1:
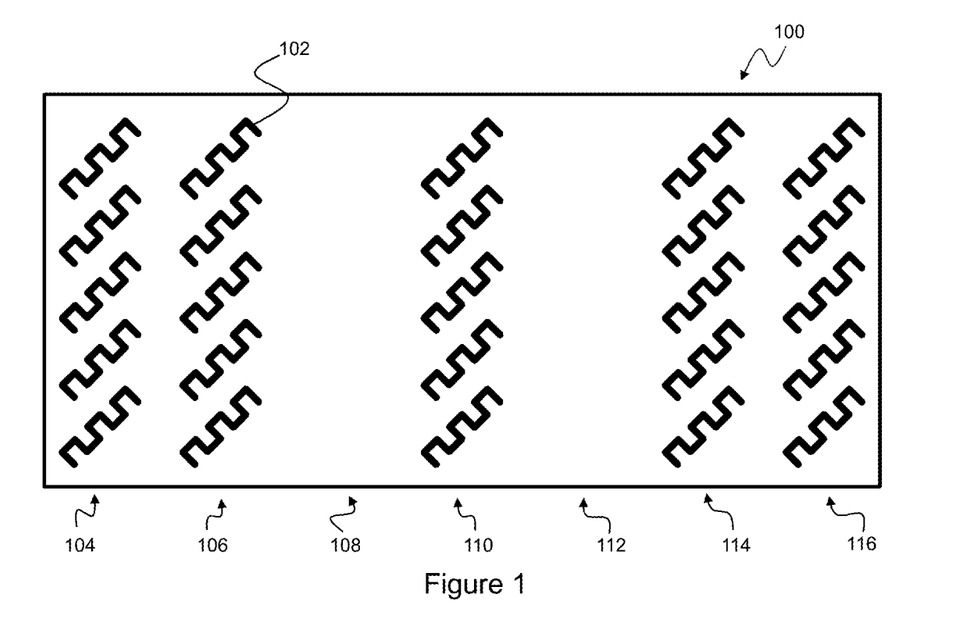
FIG. 1 is a schematic diagram of a mm-wave RFID tag embodying the invention.

FIG. 1 shows a schematic diagram of a mm-wave RFID tag 100 embodying the invention. The tag 100 comprises an arrangement of conductive elements, e.g. 102, which are configured to encode information spatially on a substrate. The substrate may be, for example, paper, and the conductive elements may be formed by printing on the substrate, for example using a suitable conductive ink. However, it is possible to utilise a tag structure that is the negative configuration of the aforementioned tag 100 (i.e. where the substrate is conductive and the elements of the tag are non-conductive). This alternative tag structure would be suitable for tagging metallic items, including aluminium drink cans for example.

Each of the conductive elements is adapted to scatter incident polarised mm-wave radiation and to produce a substantially orthogonally polarised reflected field. Interrogation of the tag 100 may therefore be effected by suitable irradiation of the conductive elements with mm-wave radiation having a first state of polarisation, and detecting the reflected mm-wave radiation having a second state of polarisation that is substantially orthogonal to the first state of polarisation.

As shown in FIG. 1, the arrangement of conductive elements comprises a two-dimensional array having a number (n) of columns, with each column including a number (m) of rows of conductive elements. The presence or absence of conductive elements within each column may be used to encode information spatially within the tag 100.

In the example shown in FIG. 1, the tag 100 comprises n=7 columns, labelled 104, 106, 108, 110, 112, 114, 116 respectively. Each column comprises m=5 rows of present or absent conductive elements. For example, the presence of conductive elements within a column may be used to encode a binary '1' value, while the absence of conductive elements may be used to encode a binary '0'. According to this coding scheme, the tag 100 encodes the seven-bit binary value '1101011'.

Figure 2:
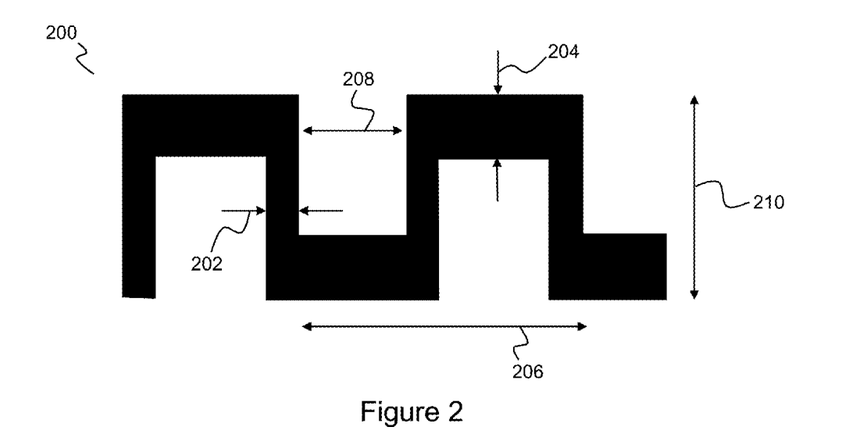
FIG. 2 is an illustration of a meander-line conductive element embodying the invention.

FIG. 2 is an illustration of a meander-line conductive element 200 embodying the invention. As is shown, the basic meander-line structure has a number of parameters that can be selected in order to control properties of the element, such as its resonance or peak reflectance frequency. These parameters include width 202 of the 'vertical' connections of the meander, thickness 204 of the 'horizontal' conductors of the meander, the spatial period 206 of the meander, the spacing 208 between vertical conductors, and the total height 210 of the meander-line. As will be appreciated, this is not a unique parameterisation of the meander-line structure, and alternative sets of parameters may be selected in order to define the structure.

Figure 3:
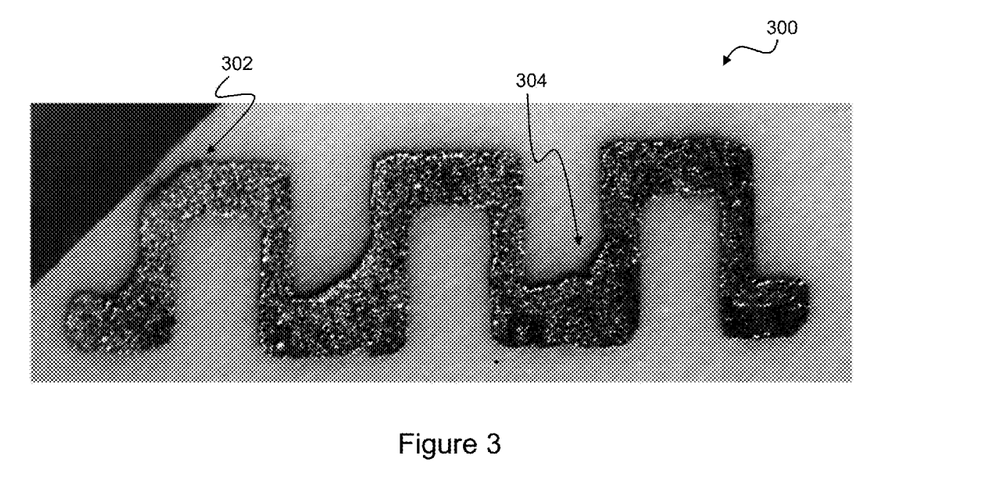
FIG. 3 is an image of a practical printed meander-line structure embodying the invention.

In practice, however, and as shown in FIG. 3, a practical printed meander-line 300 will exhibit variations from the design parameters as illustrated, for example, in FIG. 2, due to imperfections and inaccuracies in the printing process. Specifically, FIG. 3 shows an image of an actual printed meander-line embodying the invention, in which structural anomalies such as a 'rounding' 302 of external corners, and/or 'filling' 304 of internal corners may be observed.

The practical impact of printing inaccuracies is that the reflection characteristics of the meander-line 300 will not match those of the ideal meander-line 200, as designed. However, it is an advantage of embodiments of the invention that imaging of the RFID tag, e.g. 100, is not critically dependent upon resonant frequencies or bandwidth. Accordingly, tags embodying the invention, and systems in which they are employed, are generally tolerant of the types of inaccuracies in printing that are illustrated in FIG. 3.

Figure 4:
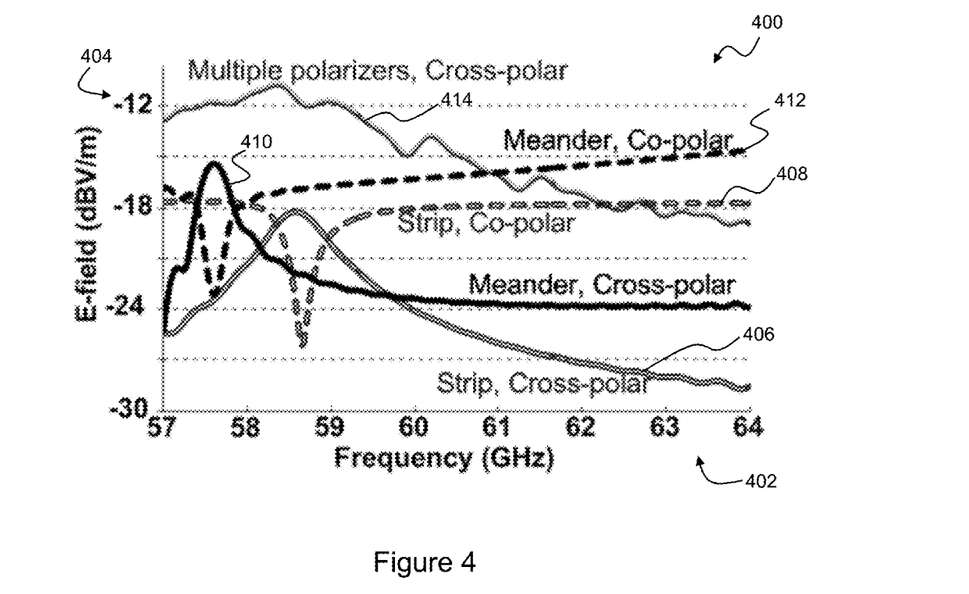
FIG. 4 is a graph comparing frequency response of alternate conductive structures.

FIG. 4 is a graph 400 showing a comparison of frequency responses of different conductive structures, including structures embodying the invention. The horizontal axis 402 shows mm-wave frequency, in GHz, while the vertical axis 404 shows electric field magnitude in dBV/m. Four of the curves in the graph 400 show theoretical frequency responses, of a single strip-line in the cross-polarisation state 406, a single strip-line in the co-polarised state 408, a meander-line embodying the invention in the cross-polarised state 410, and the same meander-line in the co-polarised state 412. These four curves clearly show the superiority, in terms of peak backscattering magnitude of the cross-polarised field, of a meander-line embodying the invention. However, these theoretical curves are valid only for the ideal meander-line structure, as illustrated in FIG. 2.

A fifth curve in the graph 400 shows the cross-polarised backscatter response of a column of five conductive meander-line elements fabricated using conductive ink and a normal printer. Due to variations in printing, this response curve 414 does not exhibit a sharp resonant peak, but instead shows a strong response over a relatively wide frequency range. The peak magnitude of the printed polariser response 414 is around 4 dB higher than the resonance peak of the single ideal meander-line 410. It is therefore apparent that the presence of the column of printed conductive meander-line elements should be readily detectable over a broad frequency range, such as around 4 GHz.

According to embodiments of the invention, the presence or absence of each column of polarisers on a tag, e.g. 100, is detected via EM imaging. Accordingly, image resolution translates directly into the spatial encoding density, and therefore information capacity, of an RFID system embodying the invention. For practical RFID systems, the required image resolution is on the order of a millimeter, such that a useful quantity of information may be stored within a reasonably compact space, such as on the surface of a substrate with area equivalent to the size of a credit card, or smaller. To achieve this required resolution within the mm-wave range (e.g. around 60 GHz) at up to 500 mm reading distance, an antenna aperture size of around 20 cm to 30 cm is required. To achieve this with a single antenna would require an excessively large interrogating device, whereas it is preferable, in practical systems, for the interrogator to be sufficiently small as to be operated as a handheld device.

Accordingly, embodiments of the invention employ a number of smaller antennas, in combination with multiple-input multiple-output (MIMO) techniques and synthetic aperture processing in order to emulate a substantially larger aperture antenna. In a particular embodiment, as will now be described with reference to FIGS. 5 to 7, the overall result is similar to a conventional phased array (PA) but without requiring any phase-shifting element, which typically comprises a significant part of the cost and complexity of a conventional phased array implementation. Accordingly, such embodiments of the invention are able to provide a relatively simple, practical and low-cost solution for EM imaging of RFID tags with spatially encoded data at sufficiently high-storage densities for use in many practical applications.

Figure 5:
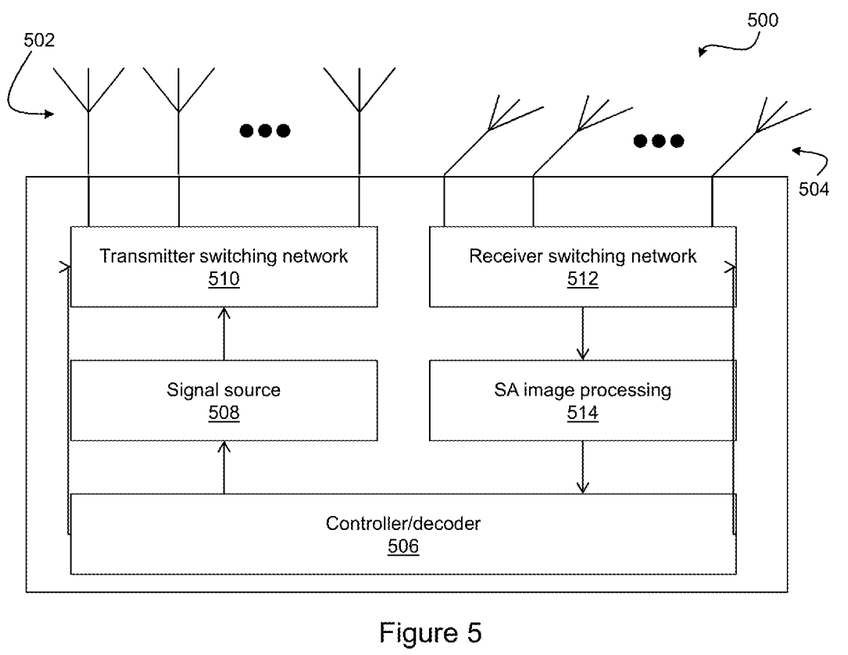
FIG. 5 is a block diagram of a mm-wave RFID tag interrogation apparatus embodying the invention.

FIG. 5 shows a block diagram 500 of a mm-wave RFID tag interrogation apparatus embodying the invention. The interrogation apparatus 500 comprises a plurality (P) of transmitting antennas 502, and a further plurality (Q) of receiving antennas 504. As shown, the transmitting antennas 502 and receiving antennas 504 are configured to transmit/receive signals having orthogonal polarisation states. Accordingly, mm-wave signals transmitted via the transmitting antennas 502, and reflected in an orthogonal polarisation state from the conductive elements of an RFID tag, e.g. 100, embodying the invention, will be received via the receiving antennas 504.

The interrogation apparatus 500 further comprises a controller/decoder 506, a signal source 508, a transmitter-switching network 510 a receiver-switching network 512 and a synthetic aperture image processing unit 514. As will be appreciated by persons skilled in the art, in a practical implementation these conceptual blocks may be implemented in a variety of different ways. For example, a practical interrogation apparatus 500 may comprise a microprocessor and associated memory containing program instructions for implementing one or more of the functional blocks illustrated in FIG. 5. Alternatively, or additionally, dedicated digital hardware may be employed to perform one or more of the groups of functional operations required by the interrogation apparatus. Such digital hardware may comprise commercially available digital integrated circuits (ICs), programmable logic devices, such as field-programmable gate arrays (FPGAs), custom VLSI chips, system on chip (SOC) components, and/or any combination of these. The switching networks 510, 512 and/or the signal source 508 may be implemented using combinations of analog and digital components, with digital-to-analog (DAC) and analog-to digital (ADC) converters, amplifiers, and other components employed as required. Furthermore, the particular combination of functional blocks shown in the block diagram 500 is intended to be exemplary only, and other arrangements, combinations and divisions of functionality are also possible. These are substantially matters of engineering design, and all such variations will be apparent to persons skilled in the art based upon the description of the principles underlying embodiments of the invention, as described herein.

In the embodiment represented by the block diagram 500, it is a function of the controller/decoder 506 to activate the signal source 508 as required, and to control the transmitter-switching network 510. In particular, the switching network 510 may be configured to connect the signal source 508 to at least any one of the transmitting antennas 502. The signal source 508 may then be operated to generate a mm-wave RF signal, such as, for example, a chirped pulse, which is transmitted via the selected antenna.

If an RFID tag, e.g. 100, embodying the invention falls within the radiation field of the transmitting antenna, a cross-polarised field will be backscattered from any of the conductive elements of the tag. Such backscattered fields will be received by the receiving antennas 504, any one or more of which may be selected by operation of the receiver-switching network 512 by the controller/decoder 506. The selected received signal is input into the synthetic aperture image processing block 514, which is configured, upon collection of sufficient received data, to reconstruct an image of the backscattered fields. This image can then be processed by the controller/decoder block 506 in order to retrieve the information encoded in the spatial arrangement of conductive elements.

Figure 6:
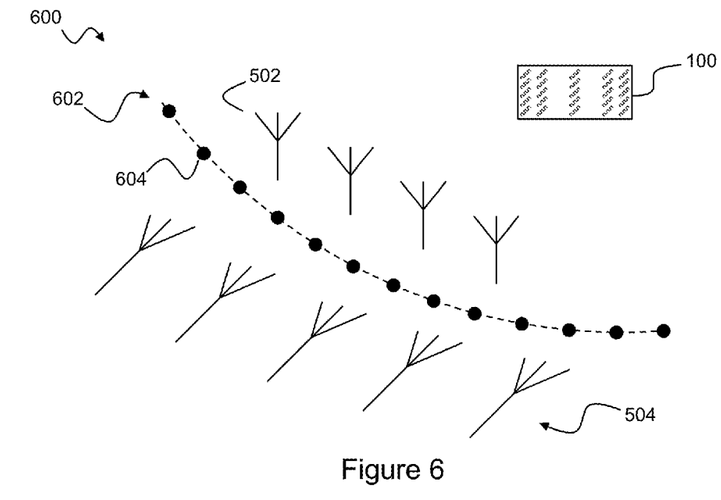
FIG. 6 is a schematic diagram of a mm-wave RFID imaging system embodying the invention.

While FIG. 5 shows a functional block diagram 500 of an interrogation apparatus, FIG. 6 shows a schematic diagram 600 of a spatial arrangement of the transmitting antennas 502, receiving antennas 504, and tag 100 under interrogation, according to an exemplary embodiment. According to this embodiment the transmitting antennas 502 and receiving antennas 504 are arranged in corresponding parallel and substantially linear arrays. After gathering of data from transmitted/received signals, the synthetic aperture image processing block 514 executes a synthetic aperture algorithm which emulates a virtual antenna array 602 having a larger number of virtual antenna elements, e.g. 604, and a larger aperture size than the real antenna array comprising the transmitting and receiving antennas. The manner in which the data gathering and processing is performed, according to an exemplary embodiment, will now be described with reference to the flowchart 700 shown in FIG. 7.

Figure 7:
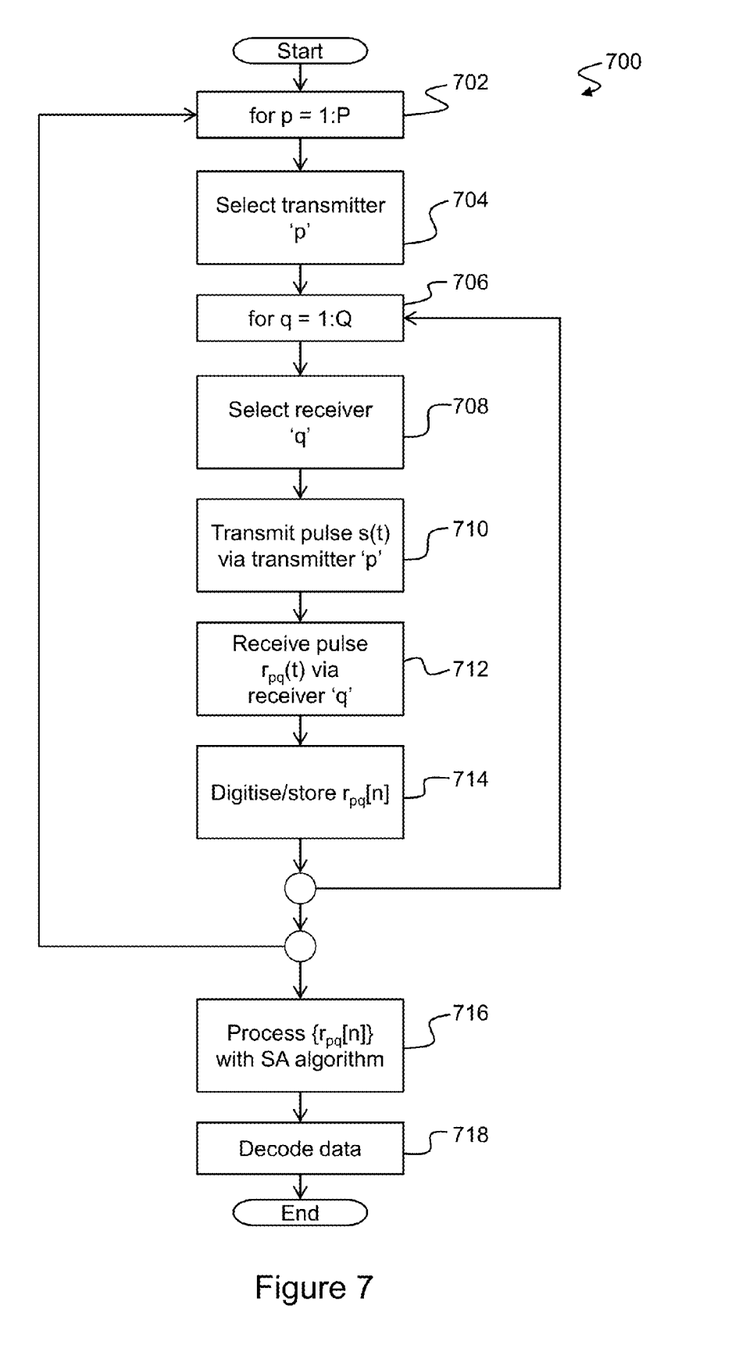
FIG. 7 is a flowchart of a multiple-input multiple-output phased array algorithm embodying the invention.

The flowchart 700 can generally be described as implementing a MIMO-PA algorithm according to an embodiment of the invention. According to an outer loop 702 of a data-gathering process, each transmitting antenna (p) is selected 704 in turn via the switching network 510. According to an inner loop 706, each receiving antenna (q) is then selected 708 in turn via the receiver-switching network 512. The signal source 508 is then operated to transmit 710 a pulse via transmitter (p) which is received 712 via receiver antenna (q). At this stage, the received pulse $r_{pq}$ (t) may be digitised and stored 714 in a corresponding memory by the image processing block 514. The loops 706,702 are repeated until received pulse data has been gathered for every combination of transmitting and receiving antennas.

The resulting array of received pulse data is then processed 716 by the image processing block 514, via a synthetic aperture algorithm. The theory and implementation of a suitable algorithm is described in W. Q. Wang, 'Virtual Antenna Array Analysis for MIMO Synthetic Aperture Radar,' *International Journal of Antennas and Propagation*, Hindawi Publishing Corporation, 2012. The result of the processing 716 is a spatial image representing 'target' locations corresponding with regions of cross-polarised backscattering of mm-wave radiation, i.e. locations of conductive elements on a mm-wave RFID tag embodying the invention. At step 718, this image data is decoded, e.g. by the controller/decoder block 506, in order to extract the information encoded in the tag.

It should be noted that while the flowchart 700 shows all combinations of transmitting and receiving antennas being activated (i.e. a total of PQ transmitted/received pulses), in practice, and depending upon the specific spatial arrangement of antennas 502, 504 it may not be necessary to collect data from all transmitter/receiver combinations. The reason for this may be understood by considering that each selected pair of transmitting and receiving antennas is equivalent to a bi-static antenna array producing a mono-static phase centre. This phase centre corresponds with a position of an element in the virtual array 602, such as the virtual antenna location 604. There may, however, be other combinations of transmit/receive antennas corresponding with the same array element, e.g. 604. In this case, these further combinations are redundant, and may be skipped in the execution of the process 700. The redundancy is readily eliminated by skipping combinations of (p, q) within the loops 702, 706 for which data corresponding with the same equivalent virtual array element has already been obtained. Alternatively, a specific set of transmit/receive antenna pairs {(p, q)} can be predetermined according to criteria which avoid redundancy.

According to some embodiments of the invention the transmitted pulses generated by the signal source 508 comprise chirped pulses. For example, a linear FM signal may be used, having a chirp rate in the range of hundreds of GHz/s. Thus a pulse of a few milliseconds in duration may cover a bandwidth of a few GHz, e.g. corresponding with the broad peak in the column backscattering curve 414. Depending upon the number of transmit and receive antennas, and their spatial arrangement, the number of pulses required may be on the order of 10 to 100, implying a total data-gathering time on the order of 0.1 seconds to one second.

In a particular proof of concept demonstration, a 127 element virtual array with an effective length of 25 cm has been emulated through 31 transmitting and 24 receiving fixed antennas confined to a 12.5 cm physical length. A pulse comprising a linear FM signal with a chirp rate of around 395 GHz/s, and having a duration of around 10 ms, was employed, thus spanning a bandwidth of approximately 4 GHz. This arrangement was employed to interrogate a printed tag having dimensions of approximately 8.5 cm×1.2 cm, and encoding 17 data bits.

Figure 8:
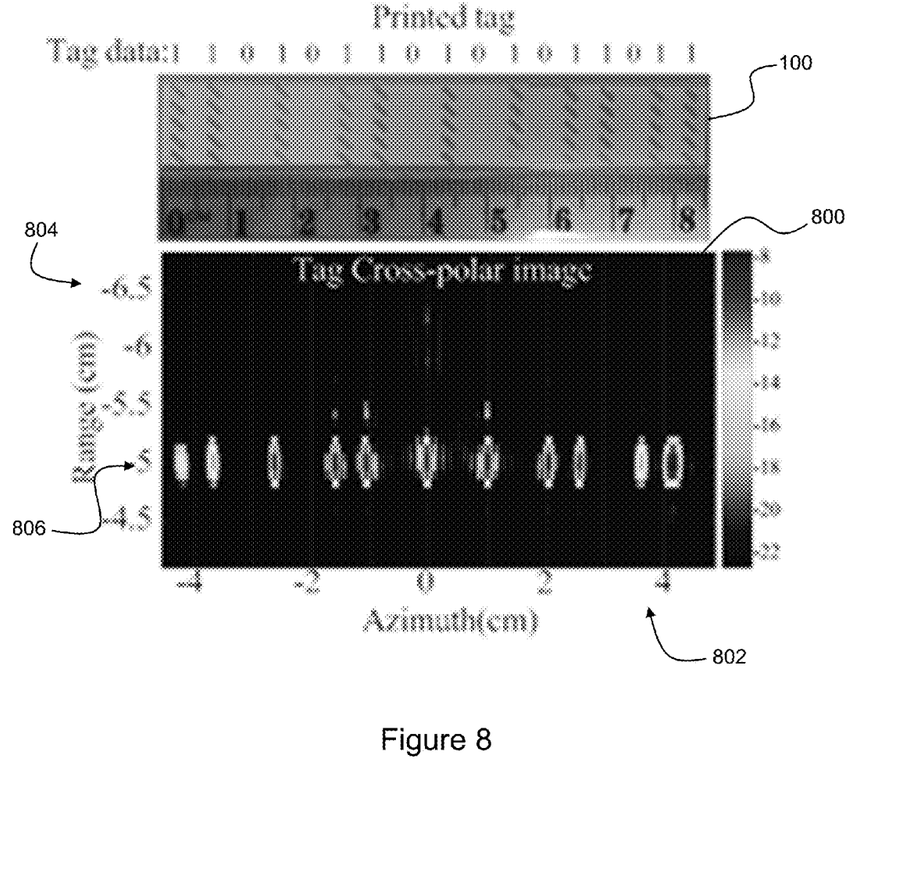
FIG. 8 shows an exemplary result of mm-wave RFID imaging of a tag embodying the invention.

An image of this exemplary tag, and the result of processing via the synthetic aperture algorithm, is shown in FIG. 8. The cross-polar image 800 is coded to show reflectance across the linear dimension 802 of the tag, and as a function of range 804. An array of reflectance image peaks 806 clearly shows the spatial identification of the columns of reflective conductive elements of the tag, with the encoded data ('11010110101011011') readily discernible.

In an alternative proof of concept demonstration, a 150 element virtual array with an effective length of 30 cm has been emulated through 14 transmitting and 11 receiving fixed antennas confined to a 12.5 cm physical length. The 14 transmitting fixed antennas and the 11 receiving fixed antennas is the minimum theoretical number of real antennas on MIMO basis that can produce the effect of the 150 element virtual array. This is the result of MIMO optimisation through a Genetic Algorithm (GA). Similar to the previous proof of concept demonstration, a pulse comprising a linear FM signal with a chirp rate of around 395 GHz/s, and having a duration of around 10 ms, was employed, thus spanning a bandwidth of approximately 4 GHz. This arrangement was employed to interrogate a printed tag having dimensions of approximately 8.5 cm×1.2 cm, and encoding 17 data bits.

Figure 9:
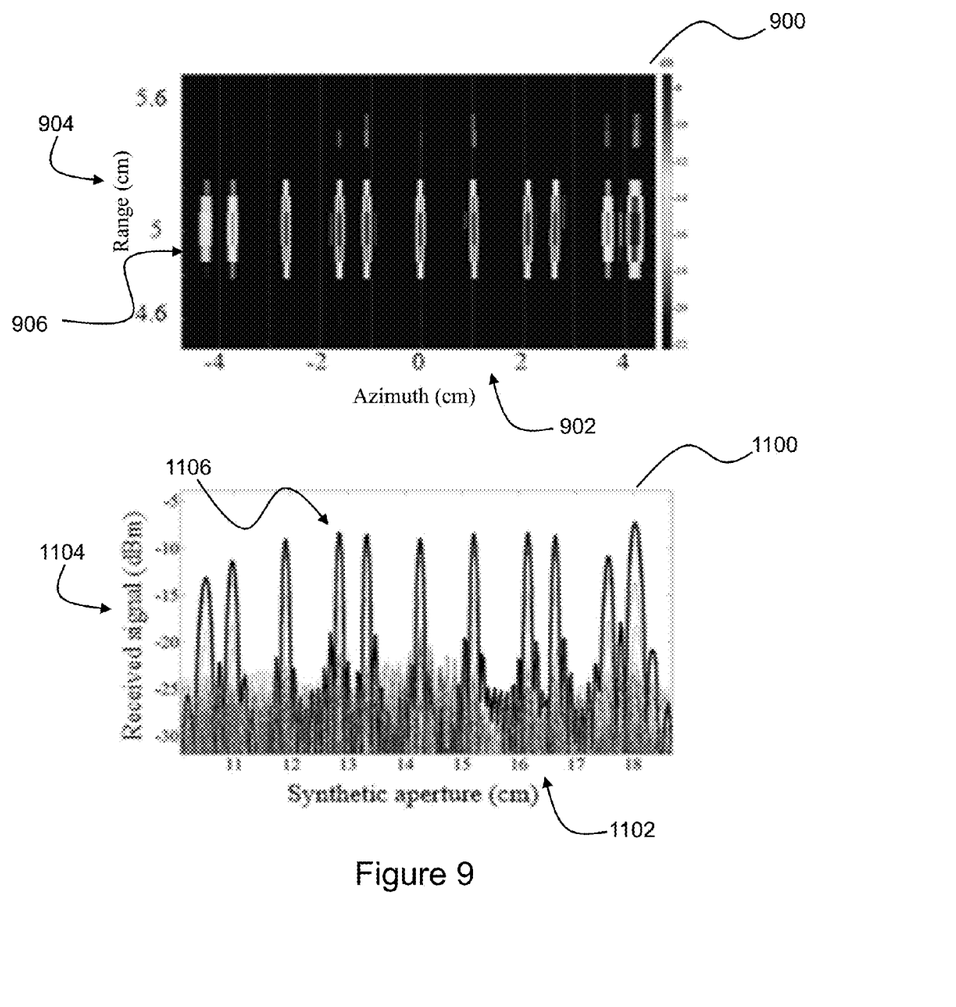
FIG. 9 shows exemplary results of mm-wave RFID imaging of a tag embodying the invention.

The result of processing this printed tag via the synthetic aperture algorithm using this alternative design, is shown in FIG. 9. The cross-polar image 900 is coded to show reflectance across the linear dimension 902 of the tag, and as a function of range 904. An array of reflectance image peaks 906 clearly shows the spatial identification of the columns of reflective conductive elements of the tag, with the encoded data ('11010110101011011') readily discernible. Also, from the plot 1100 of the received signal 1104 as a function of the synthetic aperture 1102, the spatial identification of reflective conductive elements of the tag can be determined from the peaks and troughs in the received signal 1106.

The acquired cross-range resolution determined from the results shown in FIGS. 8 and 9 is around 5 mm. Therefore, the detectable data encoding capacity of the printed tag is around 2 bits/cm$^2$. This would enable data-encoding capacity of around 93 bits for a tag having an area equivalent to that of a standard credit card.

While embodiments of the invention which enable separation of transmitter/receiver pairs by switching in the time domain have been described above, alternative implementations are possible within the scope of the invention. The key requirement for the synthetic aperture processing of received signals according to the principles underlying the invention is that the signals transmitted by each one of the plurality of transmitting antennas are separable at each one of the plurality of receiving antennas. Accordingly, at the expense of some added complexity in the hardware and/or software of the interrogating apparatus, simultaneous transmission/reception of multiple signals may be implemented. In one such example, the switching network 512 may simply be replaced with a set of parallel digitisation and data storage components, corresponding with each one of the receiving antennas 504. This would enable a single transmitted pulse from one of the transmitting antennas 502 to result in simultaneous reception and collection of reflected signals via all of the receiving antennas 504. Thus the inner loop of the process 700 would be eliminated.

In other embodiments, the set of transmitting antennas 502 may be used to simultaneously transmit signals that are effectively separable at each one of the receiving antennas 504. In the embodiments described above, the transmitted signals are separable in the time domain, because each transmitting antenna is operated separately to transmit signal pulses. Other forms of separable signals include orthogonal signals, such as orthogonal sinusoidal frequency carriers, or orthogonal wavelet pulses. Such signals may be transmitted simultaneously, and received simultaneously at each one of the receiver antennas 504, and subsequently separated via corresponding signal processing techniques. For example, matched filters may be used to select a single desired received signal at each antenna. In the case of orthogonal sinusoidal frequency carriers, a bank of matched filters for all of the received signals may be implemented via Fourier transform techniques. As will be appreciated, in practice such methods may require high-bandwidth analog-to-digital conversion of signals received at all antennas 504, along with corresponding digital signal processing of each one of the received and digitised signals. Other than for relatively small numbers of transmitting antennas 502 and receiving antennas 504, such implementation may be undesirable or prohibitive on a cost basis, as compared with the simple switching networks described in greater detail above. However, in principle, such techniques embody the underlying principles of the invention, and accordingly should be understood to fall within the scope of the appended claims.

Similarly, other variations and modifications as would be apparent to persons skilled in the relevant art may also fall within the scope of the invention, which is not limited to the above-described specific embodiments, but is as defined in the appended claims.

What is claimed:

1. A mm-wave RFID tag interrogation apparatus comprising:
   a plurality (P) of transmitting antennas having a first spatial distribution and each arranged to transmit mm-wave radiation having a first state of polarisation;
   a plurality (Q) of receiving antennas having a second spatial distribution and each arranged to receive mm-wave radiation having a second state of polarisation which is substantially orthogonal to the first state of polarisation;
   at least one transmitter coupled to the transmitting antennas and configured to transmit a corresponding plurality of separable mm-wave signals;
   at least one receiver coupled to the receiving antennas and configured to extract separable signal components of corresponding mm-wave signals received via each one of the receiving antennas; and
   a processing unit arranged to receive and process the extracted signal components using a synthetic aperture algorithm so as to locate one or more spatially distributed remote cross-polarising reflecting elements;
   wherein the apparatus utilizes a multiple-input multiple-output (MIMO) combination between the plurality of transmitting antennas and the plurality of receiving antennas, and wherein the synthetic aperture algorithm and MIMO combination emulate a larger aperture size than an actual aperture size of the plurality of transmitting antennas and the plurality of receiving antennas.

2. The apparatus of claim 1 wherein the transmitter is configured to transmit the plurality of separable signals which comprises a set of pulses wherein each pulse is transmitted successively in time via a corresponding one of the transmitting antennas.

3. The apparatus of claim 2 wherein the receiver is configured to extract received signal components by gating output from each one of the receiving antennas during a period corresponding to reception of one of the set of transmitted pulses.

4. The apparatus of claim 1 wherein the synthetic aperture algorithm generates a virtual antenna array having a larger number of antenna elements and a larger aperture size than the real antenna array comprising the transmitting and receiving antennas.

5. The apparatus of claim 1 wherein the transmitting antennas and receiving antennas are arranged in corresponding parallel linear arrays.

6. An RFID system comprising an interrogation apparatus according to claim 1, wherein the one or more spatially distributed remote cross-polarising reflective elements each comprises a conductive meander-line element.

7. The system of claim 6 wherein the conductive meander-line elements are arranged in a two-dimensional array comprising a first plurality (n) of columns and a second plurality (m) of rows, wherein each column encodes an information bit.

8. A method of mm-wave RFID tag interrogation comprising:
transmitting, via a plurality (P) of transmitting antennas having a first spatial distribution, a corresponding plurality of separable mm-wave signals;
receiving, via a plurality (Q) of receiving antennas having a second spatial distribution, a corresponding plurality of received mm-wave signals;
processing the received millimeter wave signals to extract separable signal components of each received mm-wave signal; and
further processing the extracted signal components using a synthetic aperture algorithm so as to locate one or more spatially distributed remote cross-polarising reflective elements;
wherein the apparatus utilizes a multiple-input multiple-output (MIMO) combination between the plurality of transmitting antennas and the plurality of receiving antennas, and wherein the synthetic aperture algorithm and MIMO combination emulate a larger aperture size than an actual aperture size of the plurality of transmitting antennas and the plurality of receiving antennas.

9. A mm-wave RFID tag which comprises an arrangement of conductive elements configured to encode information spatially on a substrate, wherein each conductive element is adapted to scatter incident-polarised mm-wave radiation to produce a substantially orthogonally polarised reflected mm-wave radiation, and wherein each conductive element comprises a meander-line, wherein the mm-wave RFID tag is configured to be interrogated by the interrogation apparatus of claim 1.

10. The mm-wave RFID tag of claim 9 wherein the arrangement comprises a two-dimensional array comprising a first plurality (n) of columns and a second plurality (m) of rows, wherein each column encodes an information bit.

11. The mm-wave RFID tag of claim 10 wherein a first binary value is encoded by the presence of the conductive elements in a corresponding column, and a second binary value is encoded by the absence of the conductive elements in a corresponding column.

* * * * *